United States Patent Office 3,292,213
Patented Dec. 20, 1966

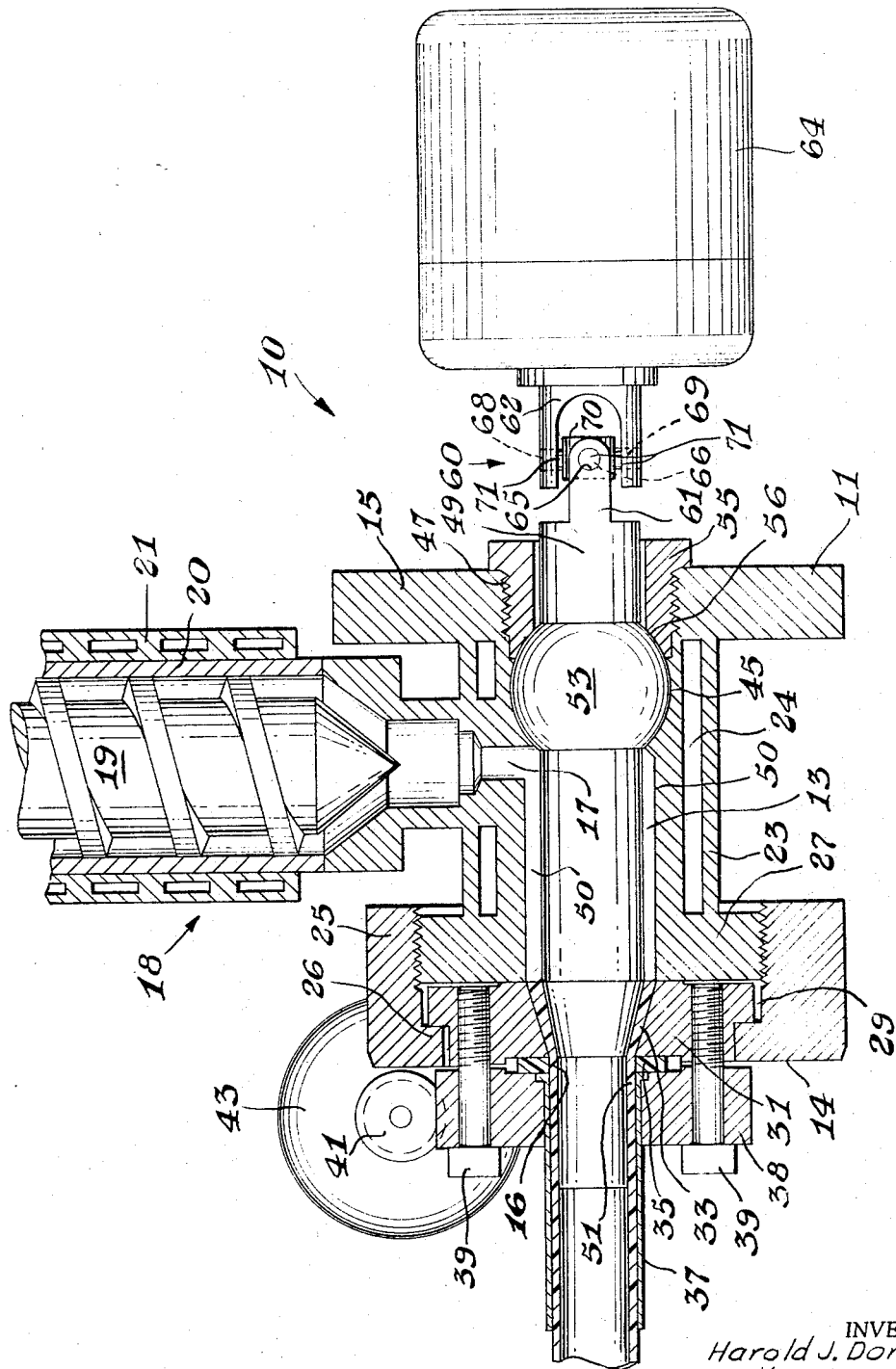

3,292,213
TUBE EXTRUSION APPARATUS
Harold Jack Donald, Midland, and Walter H. West, Bay City, Mich., assignors to The Dow Chemical Company, Midland, Mich., a corporation of Delaware
Filed Sept. 23, 1964, Ser. No. 398,541
6 Claims. (Cl. 18—14)

This invention relates to the extrusion of tubes. It more particularly relates to an improved apparatus suitable for producing tubes having substantially uniform wall thickness.

Considerable difficulty has been encountered in producing extruded thermoplastic tubing having uniform wall thickness. Such tube is produced by extrusion from an annular orifice in an extrusion die. Minor irregularities in the mechanical construction of the die, and temperature differences in the resinous material provided to the die are among various factors which contribute to the nonuniformity of the resultant product. Oftentimes such tubes are extruded and subsequently expanded by means of a fluid pressure within, such as air, to produce thin film, oftentimes thin oriented film. Irregularities which can be ignored in the production of heavy wall tubing such as pipe become of significant magnitude when a thin film is prepared. For example, when a thin film of nonuniform thickness is wound onto a roll in such a manner that the thicker portions are wound on top of each other and the thinner portions are wound on top of each other, a noncylindrical roll results and the resultant product is ill-formed and deviates considerably from the desired cylindrical configuration.

It is an object of this invention to provide an improved apparatus for tubular extrusions.

A further object of this invention is to provide an improved apparatus for the extrusion of tubular shapes of uniform wall thickness.

Another object of this invention is to provide an improved apparatus for the extrusion of thermoplastic resinous material which can impart helical orientation.

These benefits and other advantages in accordance with the present invention are achieved in an extrusion head comprising a housing defining a generally cylindrical cavity, the housing having a first end and a second end, the cavity terminating in a generally cylindrical opening adjacent the first end of the housing, an extrude passageway defined within the housing intermediate between the first and second ends and in communication with the cavity, a mandrel of a generally cylindrical configuration disposed within the cavity, the mandrel terminating adjacent the first end of the housing and in cooperative combination with the housing defining an annular extrusion orifice, the mandrel moveably supported within the housing by a bearing means so constructed and arranged so as to permit generally radial movement of the portion of the mandrel adjacent the first end.

Further features and advantages of the present invention will become more apparent from the specification when taken in connection with the drawing wherein the figure shows a partly in section view of an apparatus 10 generally in accordance with the invention.

The apparatus 10 comprises in cooperative combination a housing 11 defining therein a generally cylindrical cavity 13. The housing 11 has a first end 14 and a second end 15. The cavity 13 terminates generally adjacent the first end 14 in a generally circular opening 16. The housing 11 defines a passageway 17 which is in full communication with the cavity 13 and disposed between the first end 14 and the second end 15. An extruder 18 is in operative communication with a passageway 17 adapted to supply extrudable material thereto. The housing 11 is provided with a heating jacket 23 which in combination with the body 11 defines a heat exchange fluid circulating space 24. The first end 14 of the housing 11 comprises a bearing or ring nut 25 having a generally annular retaining portion 26. The nut 25 is threadably affixed to a body 27 of the housing 11. The body 27 and the ring nut 25 define a generally annular groove or recess 29. A die 31 is rotatably mounted within the annular cavity 29 of the ring nut 25 and retained by the annular ring 26. The die 31 defines a generally conical aperture 33 which is coaxially positioned relative to the cavity 13 of the housing 11. A gasket or spacer 35 beneficially of a heat insulating material is positioned adjacent the cavity 33 of the die 31. A sleeve or "bazooka" 37 is supported on the spacer 35 and is coaxial with the orifice 33 and maintained in position by means of a worm gear 38 secured to the die 31 by the bolts 39. The worm gear 38 is in operative engagement with a worm 41 which in turn is rotated by means of a motor 43 such as a gear head motor. The generally cylindrical cavity 13 adjacent the second end 15 of the housing 11 defines a bearing 45 adapted to permit rotation of a member and pivoting of the member about a point generally adjacent to or within the bearing. A cavity 13 defines internal threads 47 between the bearing surface 45 and the second end 15. A generally cylindrical mandrel 49 is disposed within the cavity 13. The mandrel 49 conforms generally to the configuration of the cavity 13 and in cooperation with the walls thereof defines an annular space 50 which provides a path of communication between the passage 17 and an annular extrusion orifice 51 defined by the die 31 and the mandrel 49. The mandrel 49 has a bearing surface 53 adapted to cooperate with the bearing surface 45 of the housing 11 and permit lateral displacement of the mandrel 49 within the cavity 13, that is, pivoting of the mandrel 49 about a point generally adjacent the second end 15. A mandrel retainer 55 threadably engages the threads 47 of the housing 11 and is secured therein. The retainer 55 has a bearing surface 56 adapted to engage the bearing surface 53 of the mandrel 49. The mandrel 49 terminates generally adjacent the second end 15 of the housing 11 in a portion of a flexible joint generally designated by the reference numeral 60. The flexible joint 60 comprises a first yoke 61 affixed to the mandrel 49 and a second yoke 62 secured to a motor 64 such as a gear head motor. The yoke 61 has defined therein a pair of terminal coaxial apertures 65 and 66. The yoke 62 has a similar pair of apertures 68 and 69 and a spider 70 defining four arms such as the arms 71 which are in loose sliding engagement with the terminal apertures. Thus, the joint 60 is a universal joint capable of rotary transmitting motion when the center lines of the shafts are disposed in angular relationship to each other and one of the shafts, that is the mandrel 49 has pivoted about a point other than the axis of rotation of a collinear pair of spider arms.

In operation of an apparatus in accordance with the invention, the extrudable material such as a thermoplastic resinous material is provided in a heat plastified condition and is forced through the passage 17 into the cavity 13 where it assumes a generally annular configuration and is forwarded through the cavity into the extrusion orifice 51. The mandrel 49 is rotated at a speed suitable to the particular material employed. Rotation of the mandrel 49 serves to impart orientation to the polymer as it is extruded if excessive lubricants are avoided in the formulation. If the formulation contains sufficient lubricant, appreciable orientation is avoided. As the mandrel is maintained in position primarily by the external pressure of the extrude thereon, any irregularities due to geometric deficiencies in the mandrel or die are uniformly distributed about the circumference of the tube and in effect become vanishingly small. Desirably, in many cases, rotation of the die 31 by means of the worm gear 38, worm 41 and the motor 43 preferably in the opposite direction of rotation of the mandrel 49 results in even shorter term variations in wall thickness and reduces them to a point which is insignificant or undetectable. The combination of the essentially self-centering mandrel with its rotary action eliminates the normal problems associated with die adjustment as use in operation with the mandrel is essentially self-centering.

The apparatus in accordance with the invention as illustrated is primarily adapted to the preparation of thermoplastic resinous material. However, with suitable modifications well known to those skilled in the art, other extrudable materials are readily utilized.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An extrusion apparatus comprising
    an extrusion head, the extrusion head comprising a housing defining a generally cylindrical cavity, the cavity having a longitudinal axis,
    the housing having a first end and a second end, the cavity terminating in a generally cylindrical opening adjacent the first end of the housing, the housing defining
    an extrude passageway intermediate between the first and second ends and in communication with the cavity,
    a mandrel of a generally cylindrical configuration disposed within the cavity, the mandrel terminating adjacent the first end of the housing and in cooperative combination with the housing defining an annular extrusion orifice having an axis of generation, the mandrel supported within the housing by
    a bearing means at the second end of the housing, the bearing means so constructed and arranged so as to permit pivoting of the portion of the mandrel adjacent the first end of the housing in a generally radial direction relative to the axis of generation,
    an extruder adapted to supply a heat plastified thermoplastic resinous material in communication with the first end of the cavity, and
    means to rotate the mandrel.

2. The apparatus of claim 1 wherein the bearing means is so constructed and arranged to permit rotation of the mandrel about an axis of generation of the annular extrusion orifice.

3. The apparatus of claim 2 wherein a terminal portion of the first end of the housing which defines the extrusion orifice is rotatably mounted.

4. The apparatus of claim 1 wherein the bearing means comprises mating spherical surfaces disposed generally adjacent the extrude passageway.

5. An extrusion head comprising
    a housing defining a generally cylindrical cavity,
    the housing having a first end and a second end, the first end of the housing defining a generally cylindrical opening,
    the first end of the housing being rotatably mounted and adapted to rotate about the axis of the generally cylindrical cavity, and
    means to rotate the first end of the housing,
    an extrude passageway defined within the housing intermediate between the first end and second end and in communication with the cavity,
    a mandrel of generally cylindrical configuration disposed within the cavity, the mandrel terminating adjacent the first end of the housing and in cooperative combination with the housing defining an annular extrusion orifice, the mandrel rotatably supported within the housing by a bearing means so constructed and arranged so as to permit pivoting in a generally radial direction of the mandrel adjacent the first end of the housing, relative to the axis of the cavity, and
    means to rotate the mandrel without significantly restricting the generally radial motion thereof.

6. The apparatus of claim 5 wherein the end of the mandrel remote from the first end of the housing defines a yoke, the yoke defining a pair of diametrically opposed apertures, the drive means having a yoke with generally similar apertures, a spider member adapted to engage the yoke apertures and permit simultaneous rotary and lateral movement of the mandrel.

References Cited by the Examiner

UNITED STATES PATENTS

| | | | |
|---|---|---|---|
| 1,881,917 | 10/1932 | Parkhurst | 18—12 |
| 2,461,630 | 2/1949 | Cozzo | 18—14 |
| 2,465,482 | 3/1949 | Rhodes | 18—14 X |
| 2,801,441 | 8/1957 | Wadsworth | 18—14 |
| 3,051,990 | 9/1962 | Peterson | 18—12 X |
| 3,059,277 | 10/1962 | Pierce et al. | 18 |
| 3,111,714 | 11/1963 | Branscum | 18—13 X |

WILLIAM J. STEPHENSON, *Primary Examiner.*